United States Patent
Wei et al.

(10) Patent No.: US 9,817,205 B2
(45) Date of Patent: Nov. 14, 2017

(54) LENS MODULE

(71) Applicants: Chuandong Wei, Shenzhen (CN); Jie Ma, Shenzhen (CN); Junjie Yan, Shenzhen (CN); Yuchan Gao, Shenzhen (CN)

(72) Inventors: Chuandong Wei, Shenzhen (CN); Jie Ma, Shenzhen (CN); Junjie Yan, Shenzhen (CN); Yuchan Gao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/082,852

(22) Filed: Mar. 28, 2016

(65) Prior Publication Data
US 2017/0139175 A1    May 18, 2017

(30) Foreign Application Priority Data
Nov. 17, 2015    (CN) ................... 2015 2 0917192 U

(51) Int. Cl.
*G02B 7/02* (2006.01)
*G02B 9/04* (2006.01)
*G02B 7/00* (2006.01)
*G02B 13/00* (2006.01)

(52) U.S. Cl.
CPC .......... *G02B 7/026* (2013.01); *G02B 7/003* (2013.01); *G02B 7/021* (2013.01); *G02B 7/025* (2013.01); *G02B 9/04* (2013.01); *G02B 13/001* (2013.01); *G02B 7/02* (2013.01); *G02B 13/003* (2013.01)

(58) Field of Classification Search
CPC .......... G02B 7/02; G02B 7/021; G02B 7/022; G02B 7/025; G02B 7/026; G02B 7/102; G02B 9/04; G02B 13/001; G02B 13/003; G02B 13/18; G03B 17/00; H04N 5/2252; H04N 5/2254; H04N 5/74
USPC ....... 359/740, 793, 811, 819, 823, 824, 826, 359/830; 348/25, 31, 360, 362, 373, 374; 396/89, 91, 98
See application file for complete search history.

(56) References Cited

U.S. PATENT DOCUMENTS

| | | | |
|---|---|---|---|
| 5,079,575 A * | 1/1992 | Nii ........................ | G02B 7/10 359/694 |
| 7,230,777 B2 * | 6/2007 | Ye ......................... | G02B 7/021 359/701 |
| 7,715,126 B2 * | 5/2010 | Apel ..................... | G02B 7/026 359/819 |
| 7,944,633 B2 * | 5/2011 | Shyu ..................... | B29C 43/18 359/811 |

(Continued)

*Primary Examiner* — Loha Ben
(74) *Attorney, Agent, or Firm* — Na Xu; IPro, PLLC

(57) ABSTRACT

The present disclosure discloses a lens module. The lens module includes a lens barrel and a lens group. The lens group is installed inside the lens barrel. The lens barrel includes a first barrel wall extended horizontally and a second barrel wall bended and extended from the first barrel wall. The lens module also includes a stop and a press ring. The stop is fixed on the first barrel wall. The press ring is located on the stop and presses on the stop. The stop and the lens group are lined up in turn from object side to image side. The length of the lens barrel is reduced due to the stop and the press ring, when shaping of lens barrel is being done, production difficulty of shaping is decreased, and the yield of qualified lens barrel is increased.

10 Claims, 1 Drawing Sheet

(56) References Cited

U.S. PATENT DOCUMENTS

| | | | | |
|---|---|---|---|---|
| 8,982,486 B2* | 3/2015 | Mori | .................. | B29C 45/1671 |
| | | | | 359/819 |
| 9,223,115 B2* | 12/2015 | Fujii | .................... | G02B 13/001 |
| 9,746,635 B2* | 8/2017 | Wei | ........................ | G02B 7/026 |

* cited by examiner

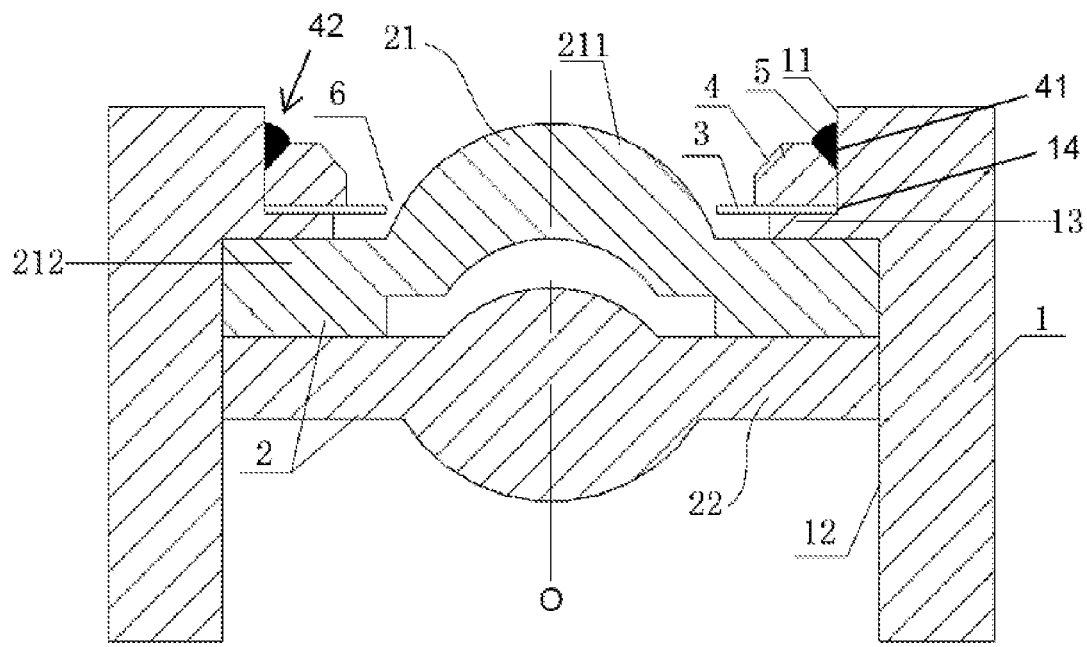

LENS MODULE

FIELD OF THE DISCLOSURE

The present disclosure generally relates to the technical field of optical imaging, more particular to a lens module used in camera, video camera, mobile phone, tablet, notebook PC and other electronic devices.

BACKGROUND

As the photographic technology and the electronic products with photographic function are developed in recent years, optical camera lens module is used widely in all kinds of products. In order to follow the current trend that the size of electronic products becomes smaller and smaller, the lens module shall also be miniaturized.

In the existing technology, the lens module comprises a lens barrel having an optical axis, lenses located in the lens barrel, and a stop clamped between lenses. The lens barrel comprises a first barrel wall extended horizontally (direction perpendicular to the direction of the optical axis of the lens barrel) and a second barrel wall along the optical axis direction extended from the first barrel wall. A light hole is created on the first barrel wall for the lens. However, the light hole on the first barrel wall requires the barrel wall with a certain thickness; therefore, the wall thickness of the barrel wall is increased. The height and weight of entire lens module is increased. It will be more difficult to produce lens barrel.

For this reason, it is necessary to provide a novel lens module to overcome the shortcomings above.

BRIEF DESCRIPTION OF THE DRAWINGS

Many aspects of the embodiment can be better understood with reference to the following drawing. The components in the drawing are not necessarily drawn to scale, the emphasis instead being placed upon clearly illustrating the principles of the present disclosure.

FIG. 1 is a schematic diagram of a lens module in one embodiment of the present disclosure.

DETAILED DESCRIPTION

The present disclosure will be described in detail below with reference to the attached drawings and an exemplary embodiment thereof.

FIG. 1 shows a lens module in one embodiment of the utility model. The lens module comprises a lens barrel 1 and a lens group 2. The lens group 2 is installed inside the lens barrel 1. The lens barrel 1 comprises a first barrel wall 11 extended horizontally (direction perpendicular to the direction of the optical axis of the lens barrel) and a second barrel wall 12 extended from the first barrel wall 11 along the optical axis direction. The lens module further comprises a stop 3 and a press ring 4 installed inside the lens barrel. The stop 3 is fixed on the first barrel wall 11. The press ring 4 is located on the stop and presses on the stop 3. The stop 3 and the lens group 2 are lined up in turn from an object side to an image side. The stop 3 forms a light hole 6.

The quantity of the lenses in actual lens group can be changed a lot according to different types and different focal lengths of lens barrels.

The object side refers to the side of the lens barrel closer to the object. The image side refers to the opposite side of the object side. It can be seen in FIG. 1 that the first barrel wall 11 is closer to object side and the overall radial extension of the first barrel wall 11 is greater than the thickness of the second barrel wall 12.

In the lens module of the embodiment above disclosed in the utility model, the lens group 2 is provided with a first lens 21. The first lens 21 includes a first optical part 211 and a first bearing part 212 surrounding the first optical part 211. A normal projection of the first optical part 211 in direction of optical axis O is located at least partially above the stop 3.

In the lens module of the embodiment above disclosed in the utility model, the lens barrel is provided with a lug 13 extended from the inner surface of the first barrel wall 11 to the optical axis of the lens barrel. The lug 13 is clamped between the stop 3 and the first bearing part 212 of the first lens 21. A receiving groove 14 is created by the lug 13 and the inner surface of the first barrel wall 11. The stop 3 is located partially in the receiving groove. The stop is clamped between the press ring 4 and the lug 13.

The axis of the lens group and the axis of the light hole are aligned with each other and with the optical axis of the lens barrel.

In the lens module in the embodiment above, the stop is a hollow ring. In this embodiment, the thickness of the stop is 1 mm-5 mm. The main purpose of the stop is to improve the image quality of the lens by reducing the reflective light on the inner wall of the light hole, so the thickness of the stop cannot exceed the width of the lug molded with the lens barrel along an axial direction of the lens.

The press ring is made of plastic or metal. In an optional embodiment, in order to facilitate the lens module assembling, the press ring is fixed by glue on the first barrel wall.

In the embodiment that the press ring is fixed by glue on the first barrel wall, in order that the press ring and the first barrel wall are bonded firmly, the embodiment above is improved further. A glue groove for receiving glue is provided between the press ring and the first barrel wall. For example, the structure of a glue groove is as follows: a notch 5 is provided at an edge 41 of the press ring 4. The notch and the inner surface of the first barrel wall create the glue groove 42.

The advantages of the embodiments are as follows:
1. The stop is fixed on the first barrel wall. The press ring presses down the stop. The stop and the press ring create a block structure for installing the lens group and replacing the convex part molded on existing lens barrel. As total thickness of the stop and the press ring is much smaller than the width of the lug along the axial direction of the lens barrel, the length of the lens barrel is reduced greatly.
2. As the thickness of the stop and the press ring is much smaller than the width of the lug along the axial direction of the lens barrel, the reflection of the light on the inner surface of the stop and the press ring is reduced significantly when the light passes though the light hole in the lens group, thereby reducing the glare of imaging and improving the image quality of the lens.
3. When the lens barrel top has a certain thickness, the length of the lens barrel is reduced due to the stop and the press ring, thereby reducing the production difficulty of the lens barrel and increasing the yield of qualified lens barrels.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module comprising:
   a lens barrel having an optical axis and comprising a first barrel wall extended at right angles to the direction of the optical axis and a second barrel wall extended from the first barrel wall along the optical axis direction;
   a lens group installed inside the lens barrel, and comprising a stop installed inside the lens barrel and fixed on the first barrel wall; wherein:
   the lens module further includes a press ring located on the stop and pressing on the stop; and the stop and the lens group are lined up in turn from an object side to an image side along the optical axis direction.

2. The lens module according to claim 1, wherein the stop is a hollow ring.

3. The lens module according to claim 2, wherein: the lens group is provided with a first lens including a first optical part and a first bearing part surrounding the first optical part; and a normal projection of the first optical part in the direction of the optical axis is located at least partially above the stop.

4. The lens module according to claim 3, wherein: the lens barrel is provided with a lug extended from an inner surface of the first barrel wall to the optical axis of the lens barrel; the lug is clamped between the stop and the first bearing part of the first lens; and a receiving groove is created by the lug and the inner surface of the first barrel wall for at least partially receiving the stop.

5. The lens module according to claim 4, wherein the stop is clamped between the press ring and the lug.

6. The lens module according to claim 1, wherein the stop forms a light hole, and an axis of the lens group and an axis of the light hole are aligned with each other and with the optical axis.

7. The lens module according to claim 1, wherein the press ring is made of plastic or metal.

8. The lens module according to claim 1, wherein the press ring is fixed by glue on the first barrel wall.

9. The lens module according to claim 8, further including a glue groove for receiving the glue, wherein the glue is provided between the press ring and the first barrel wall.

10. The lens module according to claim 9, wherein a notch is provided at an edge of the press ring, and the notch and an inner surface of the first barrel wall cooperatively form the glue groove.

* * * * *